United States Patent
Dogaru et al.

(10) Patent No.: US 9,116,969 B2
(45) Date of Patent: Aug. 25, 2015

(54) GENERATION OF ELECTRONIC PEDIGREE

(75) Inventors: Victor Dogaru, Alameda, CA (US); Arthur F. Kaufmann, Culver City, CA (US); Martin A. Siegenthaler, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 13/460,338

(22) Filed: Apr. 30, 2012

(65) Prior Publication Data

US 2013/0290357 A1 Oct. 31, 2013

(51) Int. Cl.
*G06F 17/30* (2006.01)
*G06Q 10/08* (2012.01)
*G06Q 30/00* (2012.01)

(52) U.S. Cl.
CPC .......... *G06F 17/30569* (2013.01); *G06Q 10/08* (2013.01); *G06Q 30/018* (2013.01)

(58) Field of Classification Search
CPC . G06Q 10/08; G06Q 10/087; G06Q 10/0833; G06Q 10/0838; G06Q 20/203; G06Q 20/3674; G06F 17/30011; G06F 19/3462; G06F 19/3475; G06F 21/64
USPC .......... 707/756, 736, 793, 999.003; 340/10.1; 719/316; 235/385; 705/28, 341; 726/28
See application file for complete search history.

(56) References Cited

U.S. PATENT DOCUMENTS

| | | | |
|---|---|---|---|
| 8,819,026 B2 * | 8/2014 | Fischer | 707/742 |
| 2006/0080819 A1 * | 4/2006 | McAllister | 29/403.3 |
| 2006/0106718 A1 * | 5/2006 | Spellman et al. | 705/50 |
| 2006/0218400 A1 | 9/2006 | Kimmel et al. | |
| 2006/0277061 A1 | 12/2006 | Revanur et al. | |
| 2007/0119955 A1 | 5/2007 | Barenburg et al. | |
| 2007/0219916 A1 | 9/2007 | Lucas | |
| 2008/0073432 A1 * | 3/2008 | Barenburg et al. | 235/385 |
| 2008/0109411 A1 * | 5/2008 | Young et al. | 707/3 |

(Continued)

FOREIGN PATENT DOCUMENTS

| | | |
|---|---|---|
| CN | 101286221 A | 10/2008 |
| CN | 101520865 A | 9/2009 |
| CN | 101535845 A | 9/2009 |

OTHER PUBLICATIONS

U.S. Appl. No. 13/692,379.

(Continued)

*Primary Examiner* — Dennis Truong

(74) *Attorney, Agent, or Firm* — Stephen R. Tkacs; Stephen J. Walder, Jr.; Jeffrey S. LaBaw

(57) ABSTRACT

A pedigree data processing system receives a first item from an upstream partner and generates a receive native event for the first item. The mechanism receives pedigree data for the first item from the upstream partner, generates at least one synthetic event based on the pedigree data and stores the receive native event and the at least one synthetic event in a pedigree data repository. The pedigree data processing system determines whether to send electronic pedigree information for the first item to downstream partners using push data exchange or pull data exchange. The pedigree data processing system generates an electronic pedigree for the first item using pull data exchange based on the receive native event and the at least one synthetic event and provides the electronic pedigree to a first downstream partner pedigree system.

20 Claims, 9 Drawing Sheets

(56) References Cited

U.S. PATENT DOCUMENTS

| | | | |
|---|---|---|---|
| 2008/0120725 A1* | 5/2008 | Asher et al. | 726/27 |
| 2008/0284569 A1* | 11/2008 | Shah | 340/10.1 |
| 2008/0284597 A1* | 11/2008 | Shah | 340/572.1 |
| 2008/0284598 A1* | 11/2008 | Shah | 340/572.1 |
| 2008/0288961 A1* | 11/2008 | Shah | 719/316 |
| 2009/0001162 A1* | 1/2009 | Asher et al. | 235/385 |
| 2009/0194587 A1* | 8/2009 | Devet et al. | 235/385 |
| 2010/0111294 A1* | 5/2010 | Soppera et al. | 380/28 |
| 2010/0329464 A1* | 12/2010 | Kerschbaum | 380/279 |
| 2011/0167010 A1* | 7/2011 | Soppera et al. | 705/318 |
| 2012/0158610 A1* | 6/2012 | Botvinick et al. | 705/341 |
| 2012/0175412 A1* | 7/2012 | Grabiner et al. | 235/375 |
| 2012/0239938 A1* | 9/2012 | Thurber et al. | 713/182 |
| 2013/0080183 A1* | 3/2013 | Bond | 705/2 |
| 2013/0222116 A1* | 8/2013 | Barry, III | 340/10.1 |
| 2013/0262330 A1* | 10/2013 | Sannier et al. | 705/318 |
| 2013/0290357 A1 | 10/2013 | Dogaru et al. | |
| 2013/0290358 A1 | 10/2013 | Dogaru et al. | |

OTHER PUBLICATIONS

"Apparel, Source-to-Source", GS1 US, http://www.gs1us.org, printed Apr. 27, 2012, 2 pages.

"Discovery Services Standard (in development)", EPCglobal, http://www.gs1.org/gsmp/kc/epcglobal/discovery, printed Apr. 27, 2012, 1 page.

"EPCIS—EPC Information Services Standard", EPCglobal, http://www.gs1.org/gsmp/kc/epcglobal/epcis, printed Apr. 27, 2012, 1 page.

"E-Pedigree", tracelink, http://tracelink.com/epedigree-for-product-security-patient-safety, printed Apr. 27, 2012, 1 page.

"IBM ePedigree Application for InfoSphere Traceability Server", IBM Corporation, http://www-01.ibm.com/software/data/infosphere/traceability-server/epedigree.html, printed Apr. 27, 2012, 1 page.

"Manage Every Link in the Chain with Axway ePedigree", Axway, http://www.axway.com/products-solutions/b2b/life-sciences-solutions/epedigree, printed Apr. 27, 2012, 2 pages.

Gamma, Erich et al., "Design Patterns: Elements of Reusable Object-Oriented Software", Book, published by Addison-Wesley, 1995, 395 pages.

Notification of Transmittal of the International Search Report and the Written Opinion of the International Searching Authority, or the Declaration, Application No. PCT/IB2013/052917 dated Sep. 26, 2013, 9 pages.

* cited by examiner

*FIG. 6*

```
Set<Pedigree> getPedigree(Set<EPC> epcSet) {
    Set<Pedigree> set = getReceivedAndInitialPedigrees(epcSet);
    Set<Pedigree> result = generateShippedPedigrees(set);
    return result;
}

Set<Pedigree> getReceivedAndInitialPedigrees(Set<EPC> epcSet) {
    Set<Pedigree> result;

while (epcSet is not empty) {
        // Find a subset of epcSet which was received from the same
        // upstream partner.
        { Set<EPC> epcPartnerSet, Id upstreamId } = findSubSet(epcSet);

// Ask upstream partner 'upstreamId' for the pedigrees which contain
        // EPCs from 'epcPartnerSet'
        Set<Pedigree> pedigreesFromUpstream;
        while (epcPartnerSet not empty) {
            Pedigree pedigree = getPedigree(upstreamId, epcPartnerSet);
            epcPartnerSet = epcPartnerSet - pedigree.getEpcs();
            pedigreesFromUpstream.add(pedigree);
        }
        // Generate one or more received pedigrees wrapping all pedigrees
        // from 'upstreamId'.
        Set<Pedigree> receivedPedigrees =
                generateReceivedPedigrees(pedigreesFromUpstream);

// Add received pedigrees to result
        result.add(receivedPedigrees);

// Remove processed EPCs
        epcSet = epcSet - epcPartnerSet;
    } if (epcSet is not empty) {
        // For EPCs which are locally commissioned and have not been received
        // from a partner, generate an initial pedigree.
        Set commissionedEpcSet = LocalEPCISServer.getCommissioned(epcSet);
        Pedigree initialPedigree = generateInitialPedigrees(epcSet);

// Add to result
        result.add(initialPedigree);

// Remove processed EPCs
        epcSet = epcSet - commissionedEpcSet;
    } if (epcSet is not empty) {
        // These EPCs have not been sent by an upstream partner, and
        // have not been locally commissioned.
        Error(epcSet);
    }
    return result;
}
```

GENERATION OF ELECTRONIC PEDIGREE

BACKGROUND

The present application relates generally to an improved data processing apparatus and method and more specifically to mechanisms for generating a certified record that contains a sequence of observations of a set of uniquely identifiable items.

Electronic Product Codes (EPC) technologies provide the basis for traceability applications. As tagged items move through the supply chain, traceability applications record transaction data that is the basis for electronic pedigrees. The pedigree of an item is a list of records representing the custody changes for the item. An electronic pedigree records ownership changes such as an item sale by a manufacturer, acquisitions and sale by a wholesaler, and acquisition by a retailer.

An electronic pedigree, sometimes referred to as an epedigree or e-pedigree, is an electronic document that provides data on the history of a particular physical item or batch of a physical item. An electronic pedigree satisfies requirements for tracking physical items while using a convenient electronic form.

Supply chains increasingly encounter counterfeit items. Such products pose a wide range of risks, from revenue loss in the case of packaged consumer goods, to health hazard in the case of pharmaceutical products. Current electronic pedigree solutions attempt to address these risks by enabling supply chain partners to build an electronic pedigree which lists past and present custodians of the product. Distribution channels may sometimes involve complex circuits which makes source and transaction history verification almost impossible without electronic records.

SUMMARY

In one illustrative embodiment, a method, in a pedigree data processing system, is provided for generating electronic pedigrees. The method comprises generating a receive native event for a first item received from an upstream partner. The method further comprises receiving pedigree data for the first item from the upstream partner. The method further comprises generating at least one synthetic event based on the pedigree data. The method further comprises storing, by the pedigree data processing system, the receive native event and the at least one synthetic event in a pedigree data repository. The method further comprises determining, by the pedigree data processing system, whether to send electronic pedigree information for the first item to downstream partners using push data exchange or pull data exchange. Responsive to determining to send electronic pedigree information for the first item using a pull data exchange, the method comprises generating, by the pedigree data processing system, an electronic pedigree for the first item using pull data exchange based on the receive native event and the at least one synthetic event and providing, by the pedigree data processing system, the electronic pedigree to a first downstream partner pedigree system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 shows pseudo code for pedigree generation for sets of unit EPCs in accordance with an illustrative embodiment;

DETAILED DESCRIPTION

Figure 1:
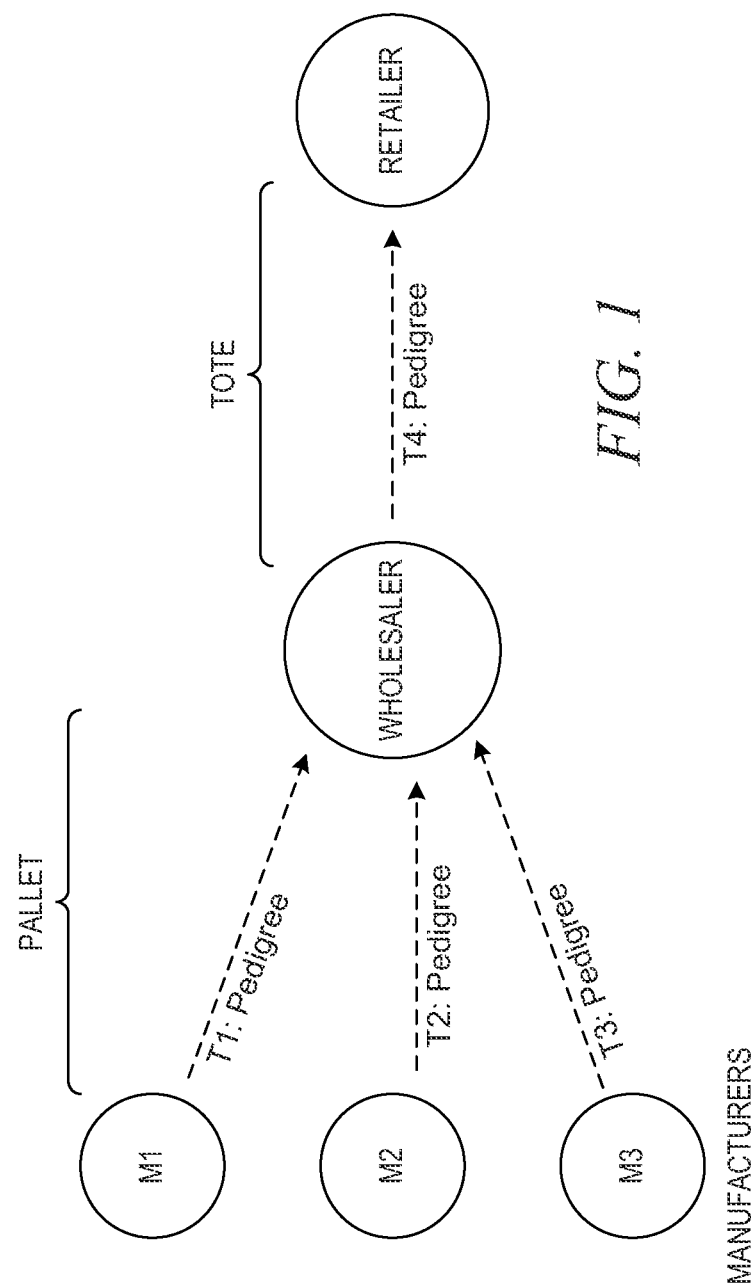
FIG. 1 illustrates a push data exchange in accordance with an illustrative embodiment.

The illustrative embodiment provide a mechanism for generating an electronic pedigree, where track and trace information is analyzed at several supply chain partners using dedicated servers to record change of custody. The mechanism of the illustrative embodiments enables supply chain partners to specify the timing of the pedigree generation and data representation. The mechanism allows supply chain partners to establish a pedigree exchange protocol that can satisfy their mutually estimated trade volumes and product counterfeit risk levels.

In response to the need for tracking products using electronic pedigrees, applications have emerged providing either centralized or distributed pedigree services.

Centralized Service

A centralized pedigree service approach requires supply chain participants to send data related to product custody changes to a central repository. Whether implemented on top of a discovery service, or simply as a hosted application for pharmaceutical pedigrees, this approach relies on a unique point of service and suffers the following drawbacks:

Unproven scalability—data storage and processing are limited by the capacity of the hosting node. As laws mandating pedigrees come into effect, transaction rates will increase to millions of pedigrees per day. Current pedigree hosted solutions provide pedigree services to specialized supply chains (pharmaceutical industry) that have only been tested with a small number of participants.

Single point of failure—data is stored in a central repository which is not under the control of the supply chain participants.

Data privacy—participants must disclose confidential transaction related information to the third party that owns the service.

Distributed Service

An alternative approach for supply chain partners is to exchange EPC traceability data without the involvement of a central repository. In this case, each partner's system can generate pedigrees for items transacted by the partner, avoiding the inherent single point of failure and confidentiality risks.

Commonly, an item comprises a pallet or tote of pharmaceuticals, for example, although an item may be any article that is at risk of tampering or counterfeiting or subject to tracking for other reasons. Alternatively, an item may be digital, such as computer software or the like.

Within a distributed pedigree service network, partners exchange traceability data along the supply chain. One implementation of a pedigree distributed service uses push data exchange, where the seller transfers pedigree to the buyer when the sold items are shipped.

States have proposed laws to substantially decrease the risk of counterfeit drugs and drug diversion. Pedigree applications for the pharmaceutical industry, which are designed to satisfy regulatory compliance, must generate a pedigree for every item received and resold. Pedigree data must be exchanged by partners at the time of product shipping. Applications satisfy this requirement by pushing the pedigree data downstream as it becomes available. This requirement poses a significant burden on scalability and may prove to be a limiting factor as the number of tracked products increases.

In contrast, generating pedigrees for a random sample of items, and enabling downstream partners to pull pedigrees from upstream has lower resource requirements, and promises much higher scalability. In accordance with an illustrative embodiment, a pull data exchange allows a buyer to query an upstream partner for pedigree data. In one example embodiment, the mechanism analyzes the risk factors that influence a partner's choice for data exchange (push/pull). Pull data exchange may benefit high volume supply chains. The illustrative embodiments also provide the design of a pedigree system that uses a combination of push and pull pedigree data exchange.

Supply chain partners may exchange pedigree data using either a push method, which allows the seller to send relevant transaction data to the buyer when the items are being shipped, or a pull method, which enables the buyer to query the seller for the pedigree data associated with a given item at any time after the sale transaction.

An electronic pedigree contains information about each transaction affecting an item that is tracked through the supply chain. An electronic pedigree records the sale of an item by a manufacturer, acquisitions and sales by wholesalers, resellers, and retailers. In theory, a pedigree ends with a final sale to a consumer; however, current applications only track items until the recorded sale to the retailer. The pedigree contains product, transaction, and partner information for the parties transacting the product.

Electronic pedigrees generated within pharmaceutical supply chains are usually represented using a document-based format. The pedigree document format provides a structure suitable to requirements provided by the Florida pedigree legislation effective in 2006. In order to comply with the law, the pedigree process requires that participants digitally authenticate each previous transaction in the pedigree and add a digital signature over their own transaction data. In order to comply with the Florida state legislation, a pedigree document can incorporate scanned paper pedigrees. At each partner in the supply chain a pedigree document must include all the previous records and the digital signatures of all previous owners. These requirements lend to a pedigree document structure where prior pedigree records are nested within the current record. Because a digital signature must be applied immediately prior to shipping and receiving, the pedigree document format works best with a push data exchange method.

The following pedigree record types are utilized in a document-based pedigree:

Initial Pedigree—contains the initial pedigree information before the first outbound transaction. An initial pedigree carries a product identifier, lot identifier, lot expiration date, etc. A scanned paper pedigree or an alternate representation of a pedigree may be included in this record to represent the prior non-electronic chain of custody for the product.

Shipped Pedigree—contains shipping information in a pedigree exchange transaction in which ownership of the product passes from one partner to another. This record wraps the preexisting pedigree and adds information about the current shipping operation to the pedigree.

Received Pedigree—contains receiving information in a pedigree exchange transaction in which there is a change of ownership. The record wraps the preexisting pedigree and adds information about the receiving step.

Repackaged Pedigree—contains the initial pedigree information for a repackaged product before the first sale. A repackaged pedigree includes the product information for the repackaged item and pedigree information about the source items used to create the repackaged item.

There are two major drawbacks related to the pedigree document format:

Limited scalability—because subsequent pedigree records are wrapped around received documents, the document size grows as it progresses through the supply chain. This will generally increase the system requirements at the downstream partners and implementation costs may become prohibitive for retailers.

Data privacy—pedigrees provided for a downstream partner must include entire pedigrees as received from upstream, even though the buyer only buys a subset of the pedigree items. Passing entire pedigrees to the downstream partner discloses business information that would otherwise be held private.

In accordance with the illustrative embodiments, an electronic pedigree application uses both a document-based format and an alternative pedigree representation based on electronic product code information system (EPCIS) events. The application subscribes to and queries an EPCIS server implementation to retrieve specific transaction information that is used for generating pedigree records.

Pedigree events are EPCIS events with specific extension attributes that carry product specific data (manufacturing lot and expiration date) and transaction data (identification of seller and buyer). Instead of nested layers, pedigree records are represented by EPCIS events with the appropriate extension attributes.

Events are not digitally signed. Instead, the overall security is guaranteed by the implied system security architecture. This allows the application to alleviate the privacy concerns associated with the pedigree document format by removing items from received pedigree events which are not being resold.

With the electronic pedigree application of the illustrative embodiments, the user has a choice of generating pedigrees as documents or extended EPCIS (pedigree) events.

Besides carrying pedigree information, EPCIS events can also be used to signal that the following important activities are occurring:

Commissioning Event—an EPCIS object event with an attribute that indicates commissioning—new or repackaged items are being associated with a unique identifier (the EPC).

Aggregation Event—an EPCIS aggregation event—items are aggregated into or disaggregated from packages.

Receiving Event—an EPCIS object event with an attribute that indicates receiving—items are being received at the location indicated by the event. This event may be used by the system to trigger the generation of a received pedigree.

Shipping Event—an EPCIS object event with an attribute that indicates shipping—items are being shipped from the location indicated by the event. This event may be used by the system to trigger the generation of a shipped pedigree.

FIG. 1 illustrates a push data exchange in accordance with an illustrative embodiment. In a push data exchange, the upstream partner (the seller) uploads onto the buyer's system the pedigree data of the items being sold. A push data exchange is triggered when the pedigree system receives a shipping event. In FIG. 1, a wholesaler buys items from manufacturers M1, M2, M3 and then sells the items to the retailer. Data flows from the manufacturers to the wholesaler and further to the retailer in the time sequence identified by t1, t2, t3, t4:

T1: An item is being shipped from manufacturer M1 to the wholesaler. At the same time, the manufacturer system uploads a pedigree onto the wholesaler's system. When the item is received, the wholesaler system augments the pedigree with a received pedigree.

T2, T3: Similar steps for manufacturers M2 and M3.

T4: The wholesaler ships items to the retailer. If the pedigree data is exchanged using the document format, the wholesaler shipped pedigree wraps around the sequence of three received pedigree documents corresponding to the received items.

A push data exchange is initiated by the upstream partner at product shipping time. If the buyer wants to authenticate the pedigree of a received item, the buyer must receive the data before they receive the product, which imposes a timing constraint on the generation of the shipped pedigree at the upstream partner.

A push data method is typically associated with a pedigree document format. In this scenario, the pedigree size grows as it travels downstream, which will generally increase the system requirements at the downstream partners.

Figure 2:
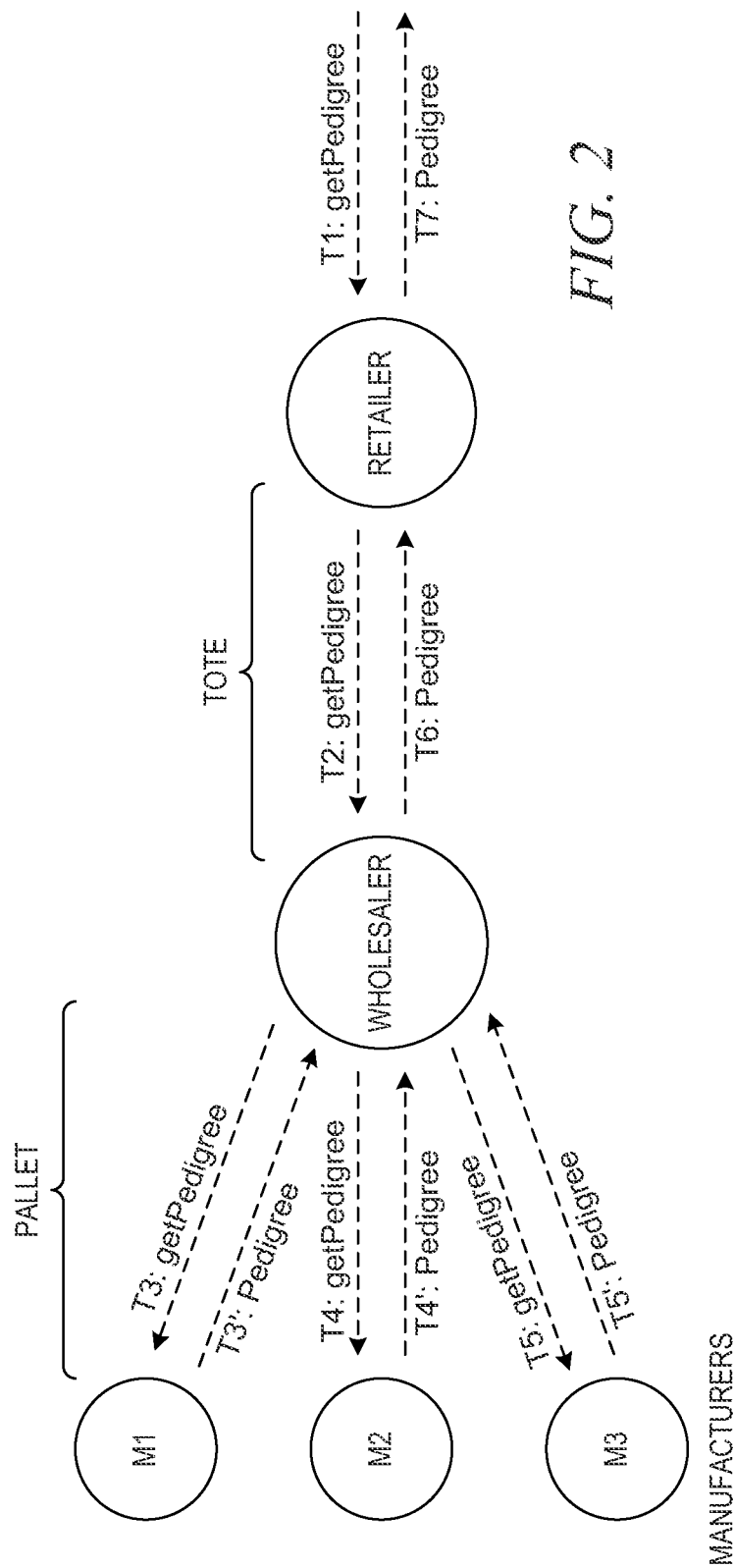
FIG. 2 illustrates a pull data exchange in accordance with an illustrative embodiment.

FIG. 2 illustrates a pull data exchange in accordance with an illustrative embodiment. In a pull data exchange, the downstream partner (the buyer) must download relevant pedigree data from the seller's system before generating a pedigree for an item. In a pull model, data exchange is triggered by the receipt of a pedigree request, which may happen at an arbitrary time after the item has been transacted. Because pedigree data is not readily available on each partner's system, the pedigree system must first retrieve the appropriate pedigree data from the upstream partner, then append pedigree data relevant to local transactions (i.e., receive and ship records).

The exchange is started when the retailer's pedigree system receives a getPedigree request from a client application. If the relevant pedigree data is not already in a local repository, the retailer's system must first retrieve the pedigree data from the upstream partners, then append the relevant receiving information and return the pedigree to the client. For simplicity, the flow of items is not illustrated; it is assumed that items have already been shipped from manufacturers to the wholesaler, and from the wholesaler to the retailer. The time sequence is indicated in the diagram:

T1: The retailer system receives a request to generate a pedigree. Before building the pedigree, the system must retrieve the pedigree data regarding the upstream transactions.

T2: The retailer system requests a shipping pedigree from the wholesaler system. The wholesaler must first retrieve pedigree data from all the supply chain partners that provided items that were later repackaged and sold to the retailer.

T3, T4, T5: The wholesaler system requests pedigrees from the relevant upstream partners.

T6: The wholesaler system generates the shipped pedigree by appending the receiving and shipping records to the pedigree data from upstream systems. The shipped pedigree is returned to the Retailer.

T7: The retailer system appends the receiving data to the wholesaler shipped pedigree in order to create the retailer received pedigree.

The pull data exchange allows the client system to request pedigrees for only a subset of the shipment, therefore this method has lower requirements on bandwidth and storage at the downstream partners.

The data exchange methods and pedigree data formats compare with respect to the following characteristics:

Timing—when does the data exchange happen with relation to the actual product movement;

Data load—how much data is being exchanged between partners;

Data privacy—whether private data is being made available to other parties;

Data certification—pedigree data may be protected against fraud using security mechanisms, such as digital signature in the case of the Pedigree document format. If data certification and product shipment happen at different times, then it might be impractical for a human certifier to authenticate the data; and, Data availability—how each data exchange mechanism deals with the risk of data loss because a partner's system becomes permanently unavailable, for example in case of system failure, or partner going out of business.

Timing

A push data exchange is initiated by the upstream partner at the time of product shipping. If the buyer wants to authenticate the pedigree of received items, then data should reach their Pedigree system before the product is being received.

A pedigree retrieved via a pull data exchange is the result of a query initiated by the downstream partner. The data retrieval can happen as early as when an advance shipping notification is received (indicating the product has been shipped from the seller). Data exchange may also be initiated at a later time, which in theory is only limited by the upstream partner's data retention policies.

Data Load

The document-based format is used with a push data exchange method. Pedigree documents grow as items get repackaged and subsequent shipping records must wrap all the inbound pedigrees related to the shipped items. Pushing pedigree data will generally increase the system requirements at the downstream partners. Information technology (IT) implementation costs may become prohibitive for small retailers.

In contrast, in a pull data exchange, the client can request the pedigree for a subset of the received items, which imposes lower bandwidth and storage requirements for pedigree data.

Privacy

In case of a push exchange method with pedigree document format, digital signatures are used for data certification. Because signatures must be applied on the local partner's record wrapped around one or more received pedigrees, the pedigree system cannot filter out data regarding items that are part of the received pedigrees, but were not sold to the current buyer. Such a system must include entire pedigrees as received from upstream, even though the buyer is only interested in a small portion of the pedigree data. Passing entire upstream pedigrees discloses business information that would otherwise be held private.

In a pull method, pedigree events can use other security techniques than digital signature, in which case a pedigree system may filter out item information that does not belong to a downstream partner.

Data Certification

The pedigree document format is designed to be compatible with paper pedigrees and accommodate a manual process; therefore, security is built into the data format. The pedigree data is authenticated by partner representatives, which digitally sign the document and all the prior pedigrees using their private key at shipping or receiving time. It is assumed that partners exchange public keys out of band, so they are readily available for authenticating received pedigrees.

In contrast, in a pull data exchange scenario, using a human certifier may be impractical, due to the delay between the moment when an item is being shipped and the moment when its pedigree is being generated. For example, at the pedigree generation time, the person who had authorized the shipment may not be with the same employer anymore. Pull data pedigree systems must rely on system generated encryption keys for data signing (i.e., using the system's credentials) or use other data certification mechanisms.

Data Availability

If the seller's system becomes unavailable after shipping the product, then the buyer may not be able to retrieve pedigree information related to the product. Because in a push data exchange method the data is being sent at the same time with the product being shipped (usually right before product shipping), the data unavailability risk is very low.

In a pull data exchange scenario, the risk of data loss is higher—the later the client requests a pedigree, the higher the risk of data being unavailable, for example because an upstream partner went out of business.

Push data exchange method provides good data loss risk mitigation, at the expense of increased storage and bandwidth requirements. Push data exchange used with pedigree document format is suitable for distributing pharmaceutical products, where pedigree certification is imposed by compliance business processes. Push data exchange method enables the buyer to implement a business process that does not allow products to be taken into custody without a certified pedigree.

Pull data exchange method has lower bandwidth and storage requirements, so it can scale to higher supply chain volumes. Push data exchange method provides better privacy and is suitable for cases where a user or a regulatory agency monitors a supply chain by creating pedigrees for a small sample of products flowing through the supply chain. The data unavailability risk can be mitigated by creating an escrow party to hold data from partners going out of business. Instead of using a person's credentials, data certification can be ensured using a pedigree system's credentials and appropriate security policies for system access.

Partners in a supply chain can use a combination of push and pull data exchange methods. If a seller does not send pedigree data about sales (and all prior changes of custody) at the ship time, then the buyer bears the risk of the partner going out of business or losing pedigree data. Trusted partners may agree to only exchange data at the time of pedigree query, thus accepting a data unavailability risk that is deemed low. However, when they do business with a new partner, they may require that the full custody data be exchanged at the time of product shipping, to mitigate perceived high risks.

A combination of methods can be used for products that have different volumes and bear different fraud risk. For example, pedigree for products that have a high risk of counterfeiting, such as pharmaceutical products, can be exchanged using a push data exchange method, thus allowing partners to have 100% pedigree authentication. For high volumes of low risk products, partners can agree to exchange pedigree data by sampling the product flow, using a pull method.

Figure 3:
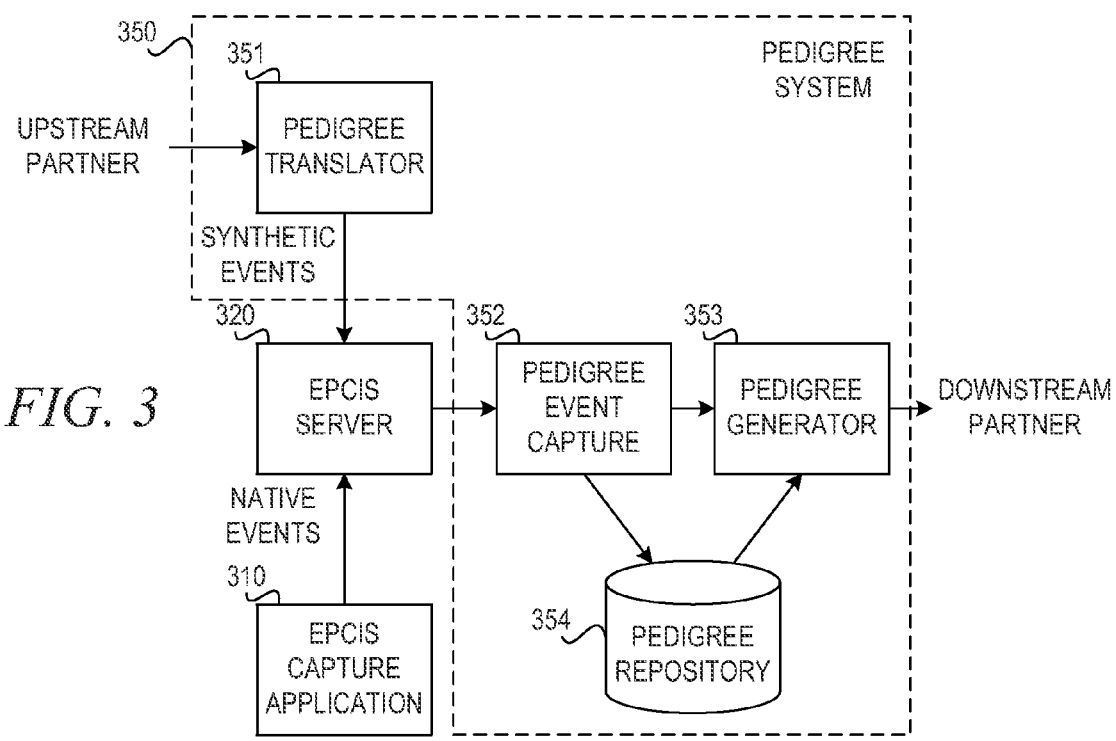
FIG. 3 is a block diagram depicting a pedigree system to use both push and pull data exchange methods to communicate with supply chain partners in accordance with an illustrative embodiment.

FIG. 3 is a block diagram depicting a pedigree system to use both push and pull data exchange methods to communicate with supply chain partners in accordance with an illustrative embodiment. The system exchanges pedigree data using either pedigree document format or as EPCIS events extended with pedigree-specific attributes (pedigree events).

The pedigree system interacts with local and remote (i.e., belonging to other partners) EPCIS servers using two query types:

EPCIS subscription query to events that are "interesting" to the pedigree system. These events act both as pedigree data containers and triggers for pedigree generation.

EPCIS poll queries to local and remote servers, which retrieve additional data that the system needs in order to build a pedigree.

Pedigree system 350 consists of pedigree event capture 352, which processes events from EPCIS server 320 to which the pedigree system subscribes; pedigree generator 353, which generates pedigrees; pedigree translator 351, which normalizes pedigree data interchange formats; and, pedigree repository 354, which stores EPC traces (the pedigree model) and pedigrees. EPCIS capture application 310 sends EPCIS events tracking product items as they are processed at the local warehouse. These events may comprise commissioning events issued when EPCs are associated with new items, shipping events issued when items are being shipped out of a warehouse, receiving events issued when items are being received, and aggregation and disaggregation events issued when items are packed or unpacked. Pedigree system 350 interacts with supply chain partner systems.

A pedigree model of an item is a history of custody changes for that item. An example model for item A may contain the following records:

Initial record—the item EPC, commissioned by manufacturer M1 at time t1, at location L1, of type (product) P, with manufacturing lot number LL and lot expiration date D;

Shipping record—item shipped to wholesaler W location L2 at time t2;

Receiving record—item received at wholesaler W location L2 at time t3;

Shipping record—item shipped to retailer R location L3 at time t4, etc.

Pedigree system 350 makes a distinction between native and synthetic events. An event is native when it is generated by the local EPCIS capture application 310, for example to indicate that a set of EPCs have been shipped. An event is synthetic when it is generated by other modules, for example by pedigree translator 351 translating an inbound pedigree. In fact, a synthetic event may be any event that is not generated locally by EPCIS capture application 310. For example, synthetic events may comprise non-local events that have been received at the local pedigree application. Synthetic events may also comprise local events that are generated from non-local information, such as pedigree documents received from a partner. Synthetic events may be generated as a result of the following activities:

1. Receiving a pedigree document from a partner. The pedigree envelope is transformed into one or more EPCIS aggregation events. Each pedigree document layer is transformed into an EPCIS shipping or receiving event at the unit level.

2. Exchanging pedigree data formatted as EPCIS events. An outbound EPCIS document contains one or more synthetic aggregation events reflecting containment relationships, and a list of shipping and receiving events at the unit EPC level.

Figure 4:
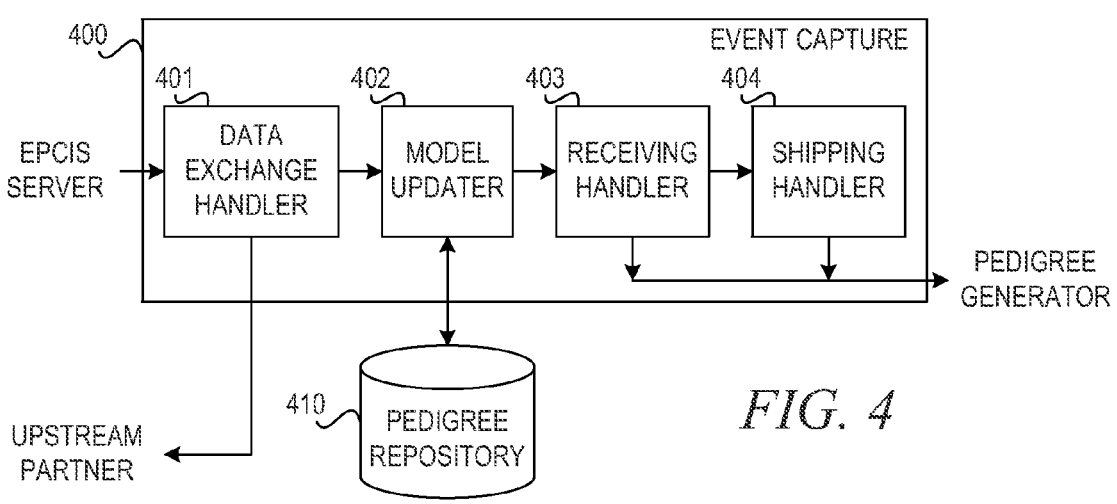
FIG. 4 is a block diagram depicting pedigree event capture in accordance with an illustrative embodiment.

FIG. 4 is a block diagram depicting pedigree event capture in accordance with an illustrative embodiment. The pedigree event capture 400 is a variation of the chain of responsibility pattern. Unlike the original pattern, where a message is passed to a chain of handlers until it is accepted by one handler, pedigree event capture 400 passes a pedigree message to all of the handlers in the event capture chain. The pedigree message can be processed by several handlers. The event capture handlers perform operations necessary for the processing of pedigree-specific events. Example operations are parsing a message, updating the local pedigree model, and triggering the generation of received and shipped pedigrees. Handlers may communicate information through a context object, which travels along the chain together with the message.

Pedigree event capture 400 captures pedigree events from the local EPCIS server and passes the pedigree events through a handler chain. Not illustrated here is the message parser, which loads an EPCIS document XML message into a memory representation and passes each event to the handlers. Data exchange handler 401 queries the upstream partner for pedigree data. This handler is triggered, for example, by native receiving events which indicate the receipt of physical items, or advance shipping events which indicate that an upstream partner has shipped items. This handler is used when the system needs to pull data as soon as an item or its advance shipping notice is received. Model updater 402 updates the state of items that are being transacted by the local partner (the pedigree model) in pedigree repository 410. Receiving handler 403 filters native receiving EPCIS events that indicate a partner for which the policy is to immediately generate a received pedigree. When triggered, receiving handler 403 posts a received pedigree request to the pedigree generator. Shipping handler 404 filters native receiving EPCIS events that indicate a downstream partner for which the policy is to immediately generate a shipped pedigree (push data exchange). When triggered, shipping handler 404 posts a shipped pedigree request to the pedigree generator.

The document-based pedigree standard defines the structure of pedigrees for sets of serialized items that are packaged into a single container. The pedigree generator implements a generation algorithm geared toward item sets and document-based structures, but may be particularized for single items. The pedigree generator retrieves pedigree data working backwards, from the latest pedigree records toward the initial record. For the case where pedigree data is pushed downstream, all pedigree records are already stored in the local pedigree repository. In contrast, when data is exchanged using a pull method, the pedigree generator must pull pedigree records from the upstream partner, if they are not already present in the local system.

The mechanisms of the illustrative embodiments can be applied within a supply chain containing an unlimited number of participants, where data is either pulled from upstream partners at pedigree generation time, or pushed downstream at item shipping time. With the same reasoning, the general algorithm is applicable to mixed environments, where some partners push pedigree data at item ship time, while others hold the data until requested by the buyer.

Figure 5:
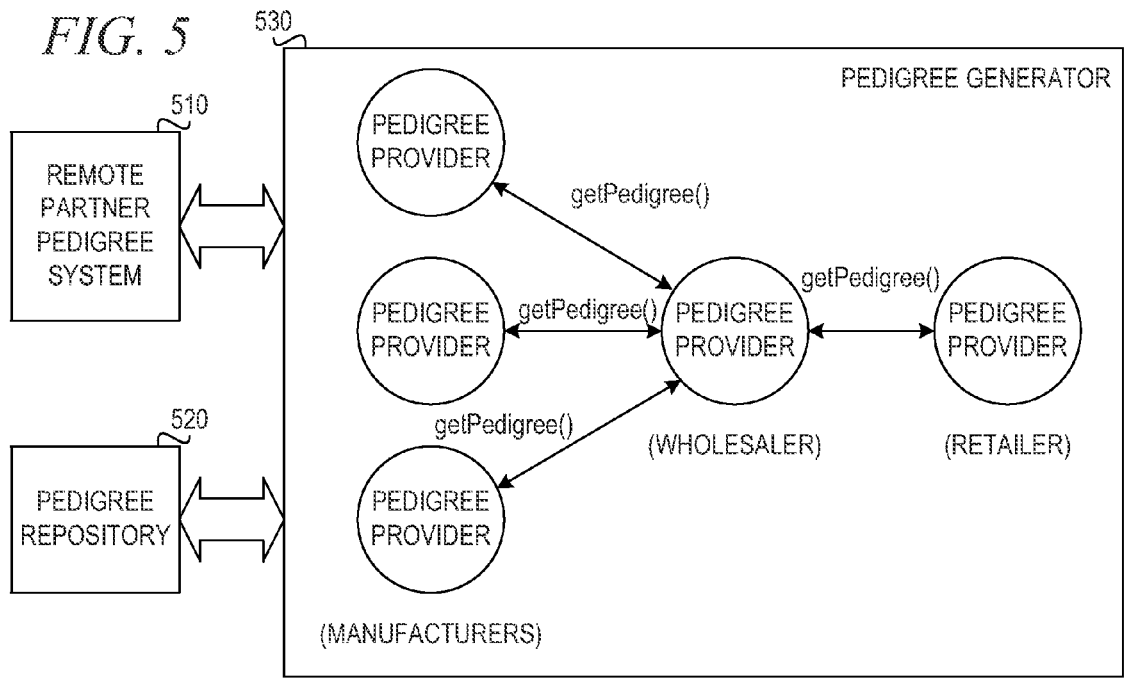
FIG. 5 illustrates multiple item pedigree generation in accordance with an illustrative embodiment.

During pedigree generation, a model of the upstream supply chain is built in memory. FIG. 5 illustrates multiple item pedigree generation in accordance with an illustrative embodiment. Each pedigree provider manages pedigree records belonging to a supply chain partner. When a pedigree provider responds to a getPedigree( ) request, pedigree generator 530 of the provider first searches the local pedigree repository 520. If data is not found, then the pedigree generator runs a remote query to the partner's pedigree system 510.

FIG. 6 shows pseudo code for pedigree generation for sets of unit EPCs in accordance with an illustrative embodiment.

Returning to FIG. 3, pedigree translator module 351 is used for normalizing pedigree data retrieved from upstream partners. Pedigree translator 351 translates data into EPCIS synthetic events. Pedigree repository 354 stores the pedigree model for transacted EPCs, inbound pedigrees received from upstream partners (optional), and outbound pedigrees sent to downstream partners (optional).

Figure 7:
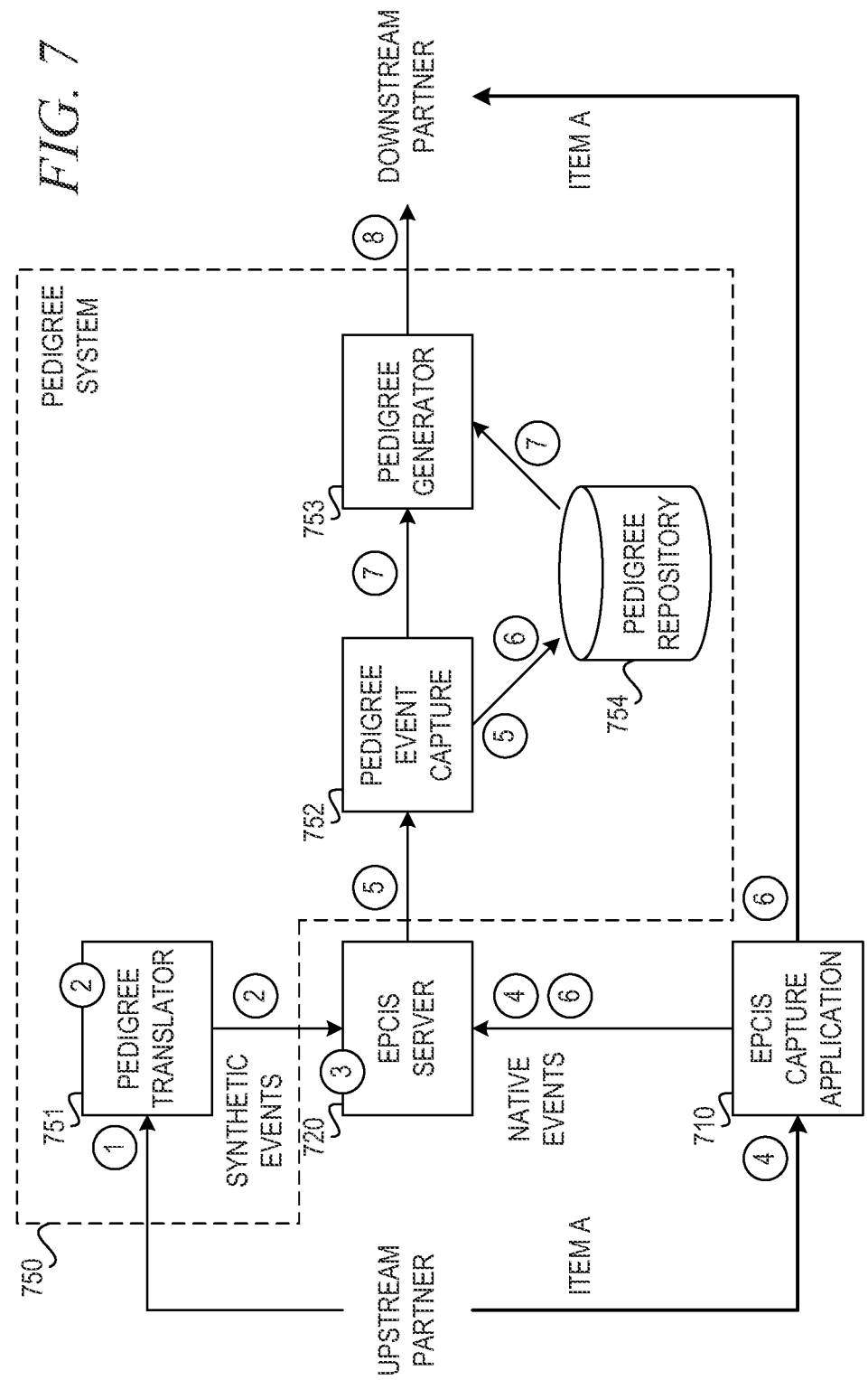
FIG. 7 is a block diagram illustrating a push data exchange scenario in accordance with an illustrative embodiment.

FIG. 7 is a block diagram illustrating a push data exchange scenario in accordance with an illustrative embodiment. In this scenario, pedigree system 750 loads pedigrees onto the downstream partner's system as soon as items are being shipped. In step 1, the system receives a pedigree for item A from the upstream partner. This message acts as an advance ship notice as well. Data may be represented either as a document-based message or as pedigree events. In step 2, pedigree translator 751 reformats document-based pedigrees into synthetic events. Optionally, pedigree system 750 may store the original document-based message into pedigree repository 754. In step 3, EPCIS server 720 records the synthetic events.

In step 4, upon receiving item A, EPCIS capture application 710 generates a native receiving event. In step 5, pedigree event capture module 752 captures the synthetic and native events and updates pedigree repository 754 accordingly. In step 6, item A is being shipped to a downstream partner. EPCIS capture application 710 generates a native shipping event.

In step 7, the native shipping and, optionally, the receiving event trigger a pedigree generation operation. Pedigree generator 753 queries the model for the relevant pedigree records of item A. Pedigree system 750 stores generated pedigrees in the repository. In step 8, pedigree system 750 pushes the shipped pedigree of item A to the downstream partner.

Figure 8:
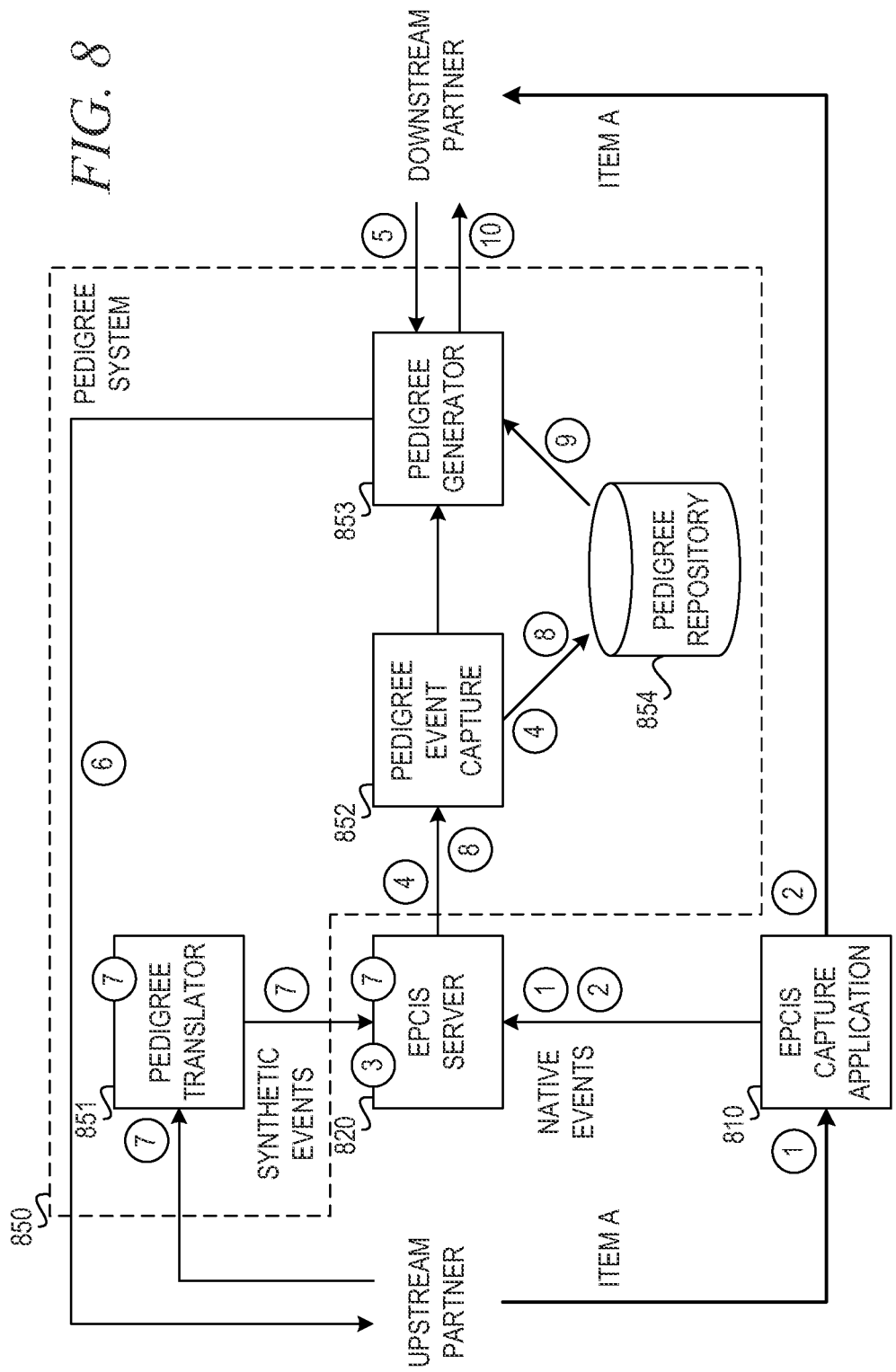
FIG. 8 is a block diagram illustrating a pull data exchange scenario in accordance with an illustrative embodiment.

FIG. 8 is a block diagram illustrating a pull data exchange scenario in accordance with an illustrative embodiment. In this scenario, pedigree system 850 retrieves pedigrees from the upstream partner's system when needed. In step 1, upon receiving item A, EPCIS capture application 810 generates a native receiving event. In step 2, item A is being shipped to a downstream partner. EPCIS capture application 810 generates a native shipping event. In step 3, EPCIS server 820 records the events. In step 4, pedigree event capture module 852 captures the receiving and shipping events and updates pedigree repository 854 accordingly.

In step 5, at a later moment, a client requests the shipped pedigree of item A. In the depicted example, the client is the downstream partner's system. In step 6, pedigree system 850 recursively calls the upstream partner's system requesting the partners' pedigrees of item A. In step 7, each given upstream partner returns the pedigree, which is directly fed into pedigree translator 851, which generates synthetic events. Pedigree system 850 updates the local EPCIS event repository 854.

In step 8, EPCIS server 820 pushes synthetic events into pedigree event capture module 852 and fills in the missing pedigree records for item A. In step 9, pedigree generator 853 appends the local receiving and shipping records of item A to generate the shipping pedigree. Then, in step 10, pedigree system 850 returns the shipping pedigree of item A to the downstream partner.

Figure 9:
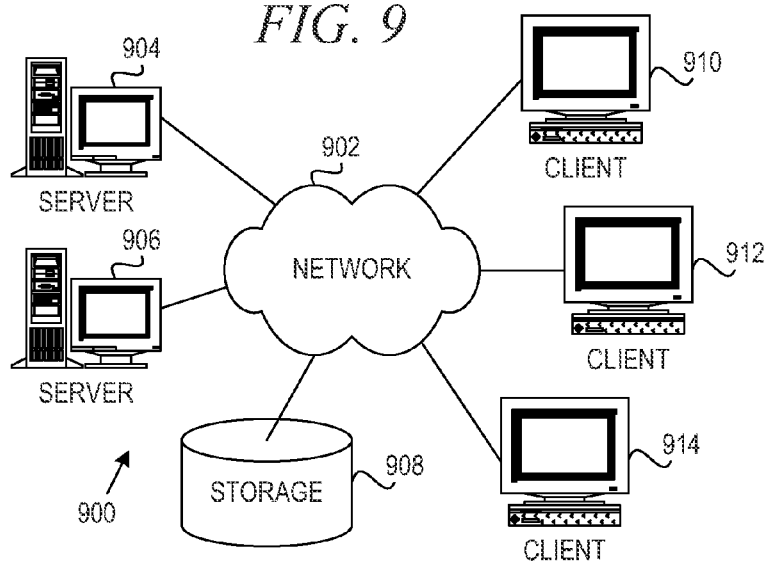
FIG. 9 depicts a pictorial representation of an example distributed data processing system in which aspects of the illustrative embodiments may be implemented.
Figure 10:
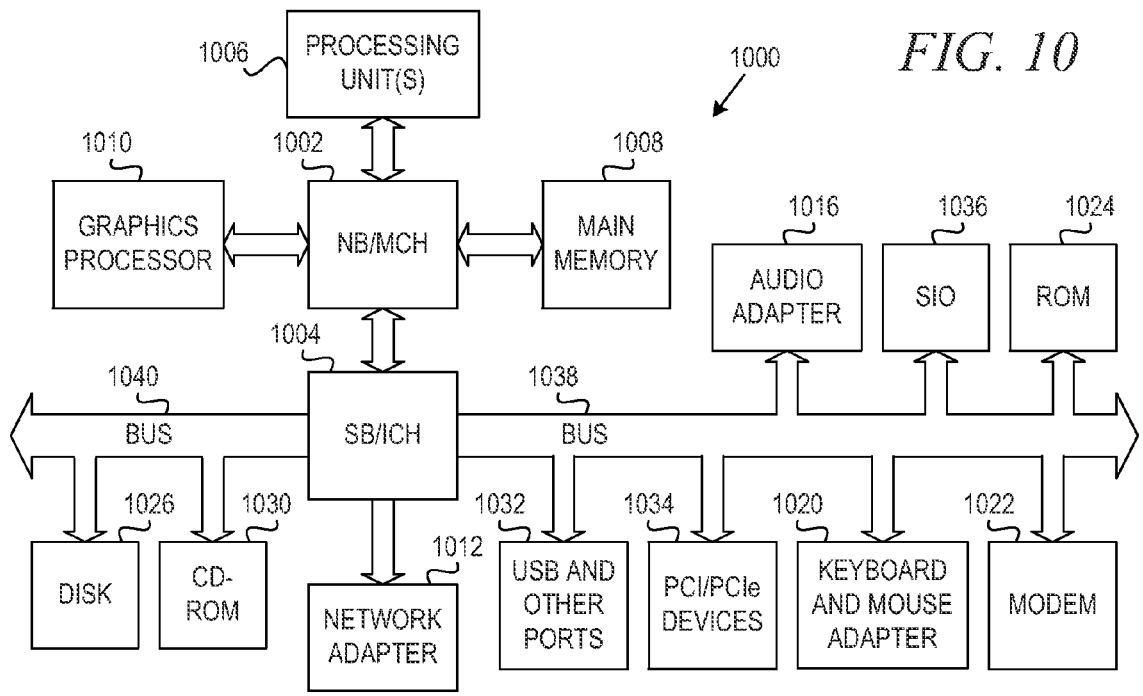
FIG. 10 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 9 and 10 are provided hereafter as example environments in which aspects of the illustrative embodiments may be implemented. It should be appreciated that FIGS. 9 and 10 are only examples and are not intended to assert or imply any limitation with regard to the environments in which aspects or embodiments of the present invention may be implemented. Many modifications to the depicted environments may be made without departing from the spirit and scope of the present invention.

FIG. 9 depicts a pictorial representation of an example distributed data processing system in which aspects of the illustrative embodiments may be implemented. Distributed data processing system 900 may include a network of computers in which aspects of the illustrative embodiments may be implemented. The distributed data processing system 900 contains at least one network 902, which is the medium used to provide communication links between various devices and computers connected together within distributed data processing system 900. The network 902 may include connections, such as wire, wireless communication links, or fiber optic cables.

In the depicted example, server 904 and server 906 are connected to network 902 along with storage unit 908. In addition, clients 910, 912, and 914 are also connected to network 902. These clients 910, 912, and 914 may be, for example, personal computers, network computers, or the like. In the depicted example, server 904 provides data, such as boot files, operating system images, and applications to the clients 910, 912, and 914. Clients 910, 912, and 914 are clients to server 904 in the depicted example. Distributed data processing system 900 may include additional servers, clients, and other devices not shown.

In the depicted example, distributed data processing system 900 is the Internet with network 902 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 900 may also be implemented to include a number of different types of networks, such as for example, an intranet, a local area network (LAN), a wide area network (WAN), or the like. As stated above, FIG. 9 is intended as an example, not as an architectural limitation for different embodiments of the present invention, and therefore, the particular elements shown in FIG. 9 should not be considered limiting with regard to the environments in which the illustrative embodiments of the present invention may be implemented.

FIG. 10 is a block diagram of an example data processing system in which aspects of the illustrative embodiments may be implemented. Data processing system 1000 is an example of a computer, such as server 904 in FIG. 9, in which computer usable code or instructions implementing the processes for illustrative embodiments of the present invention may be located.

In the depicted example, data processing system 1000 employs a hub architecture including north bridge and memory controller hub (NB/MCH) 1002 and south bridge and input/output (I/O) controller hub (SB/ICH) 1004. Processing unit 1006, main memory 1008, and graphics processor 1010 are connected to NB/MCH 1002. Graphics processor 1010 may be connected to NB/MCH 1002 through an accelerated graphics port (AGP).

In the depicted example, local area network (LAN) adapter 1012 connects to SB/ICH 1004. Audio adapter 1016, keyboard and mouse adapter 1020, modem 1022, read only memory (ROM) 1024, hard disk drive (HDD) 1026, CD-ROM drive 1030, universal serial bus (USB) ports and other communication ports 1032, and PCI/PCIe devices 1034 connect to SB/ICH 1004 through bus 1038 and bus 1040. PCI/PCIe devices may include, for example, Ethernet adapters, add-in cards, and PC cards for notebook computers. PCI uses a card bus controller, while PCIe does not. ROM 1024 may be, for example, a flash basic input/output system (BIOS).

HDD 1026 and CD-ROM drive 1030 connect to SB/ICH 1004 through bus 1040. HDD 1026 and CD-ROM drive 1030 may use, for example, an integrated drive electronics (IDE) or serial advanced technology attachment (SATA) interface. Super I/O (SIO) device 1036 may be connected to SB/ICH 1004.

An operating system runs on processing unit 1006. The operating system coordinates and provides control of various components within the data processing system 1000 in FIG. 10. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 1000 (Java is a trademark of Oracle and/or its affiliates).

As a server, data processing system 1000 may be, for example, an IBM® eServer™ System P® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 1000 may be a symmetric multiprocessor (SMP) system including a plurality of processors in processing unit 1006. Alternatively, a single processor system may be employed.

Instructions for the operating system, the object-oriented programming system, and applications or programs are located on storage devices, such as HDD 1026, and may be loaded into main memory 1008 for execution by processing unit 1006. The processes for illustrative embodiments of the present invention may be performed by processing unit 1006 using computer usable program code, which may be located in a memory such as, for example, main memory 1008, ROM 1024, or in one or more peripheral devices 1026 and 1030, for example.

A bus system, such as bus 1038 or bus 1040 as shown in FIG. 10, may be comprised of one or more buses. Of course, the bus system may be implemented using any type of communication fabric or architecture that provides for a transfer of data between different components or devices attached to the fabric or architecture. A communication unit, such as modem 1022 or network adapter 1012 of FIG. 10, may include one or more devices used to transmit and receive data. A memory may be, for example, main memory 1008, ROM 1024, or a cache such as found in NB/MCH 1002 in FIG. 10.

Those of ordinary skill in the art will appreciate that the hardware in FIGS. 9 and 10 may vary depending on the implementation. Other internal hardware or peripheral devices, such as flash memory, equivalent non-volatile memory, or optical disk drives and the like, may be used in addition to or in place of the hardware depicted in FIGS. 9 and 10. Also, the processes of the illustrative embodiments may be applied to a multiprocessor data processing system, other than the SMP system mentioned previously, without departing from the spirit and scope of the present invention.

Moreover, the data processing system 1000 may take the form of any of a number of different data processing systems including client computing devices, server computing devices, a tablet computer, laptop computer, telephone or other communication device, a personal digital assistant (PDA), or the like. In some illustrative examples, data processing system 1000 may be a portable computing device that is configured with flash memory to provide non-volatile memory for storing operating system files and/or user-generated data, for example. Essentially, data processing system 1000 may be any known or later developed data processing system without architectural limitation.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 11:
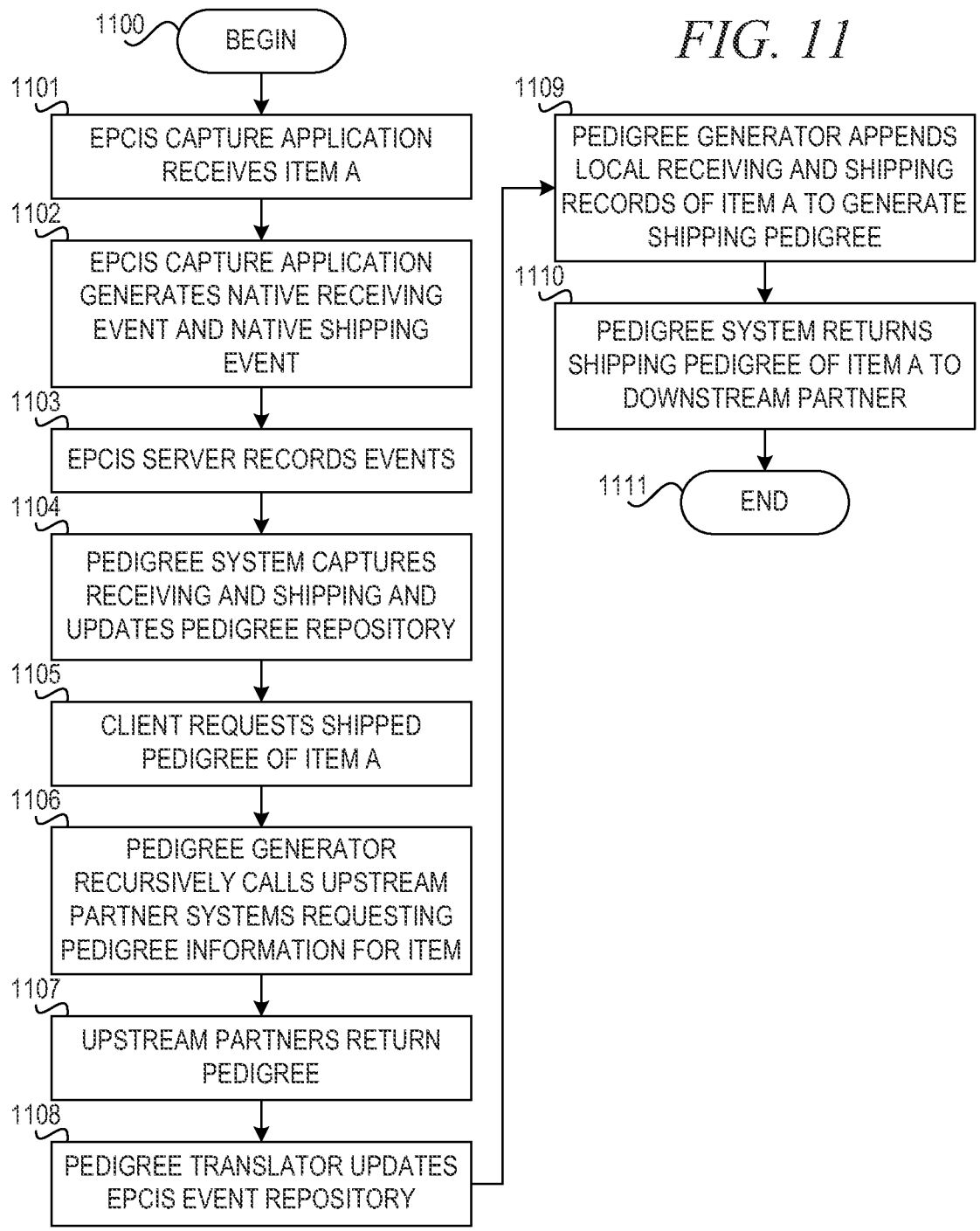
FIG. 11 is a flowchart illustrating operation of a pedigree system performing a push data exchange in accordance with an illustrative embodiment.

FIG. 11 is a flowchart illustrating operation of a pedigree system performing a pull data exchange in accordance with an illustrative embodiment. Operation begins in block 1100, and the EPCIS capture application receives an item A (block 1101). The EPCIS capture application generates a native receiving event and native shipping event (block 1102). The EPCIS server records the native receiving event and the native shipping event (block 1103). The pedigree system captures the receiving and shipping events and updates the pedigree repository (block 1104).

Subsequently, a client requests shipped pedigree of item A (block 1105). The pedigree generator recursively calls upstream partner systems requesting pedigree information for item A (block 1106). The upstream partners return pedigree information (block 1107). The pedigree translator updates the EPCIS event repository (block 1108). The pedigree generator appends local receiving and shipping records of item A to generate a shipping pedigree (block 1109). Then, the pedigree system returns the shipping pedigree to the downstream partner (block 1110). Thereafter, operation ends in block 1111.

Figure 12:
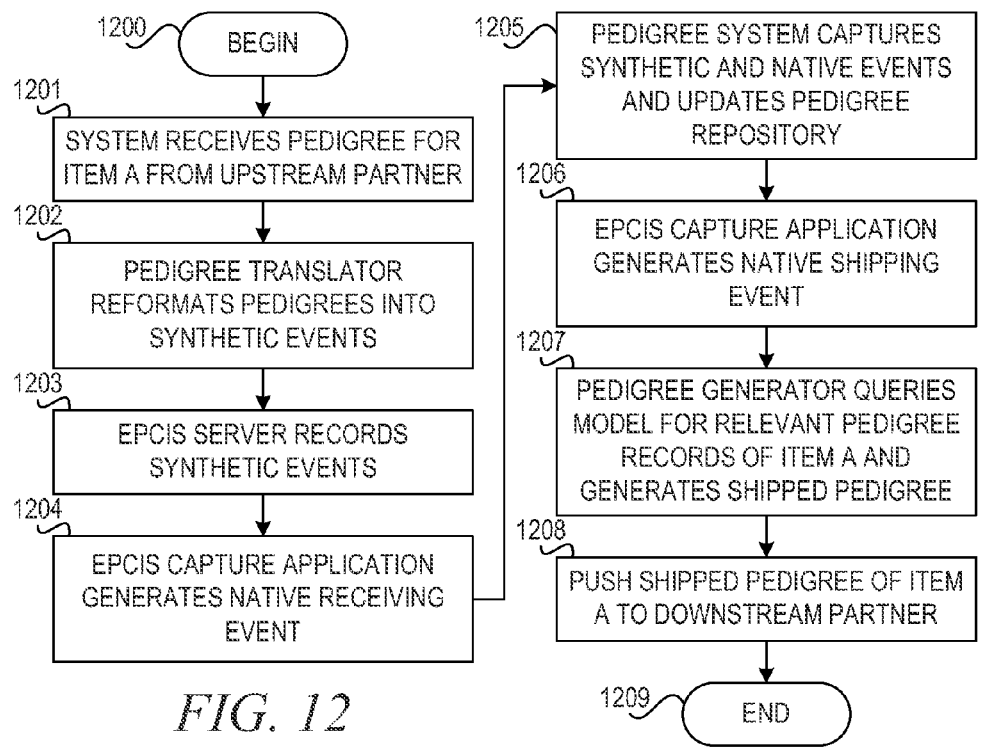
FIG. 12 is a flowchart illustrating operation of a pedigree system performing a push data exchange in accordance with an illustrative embodiment.

FIG. 12 is a flowchart illustrating operation of a pedigree system performing a push data exchange in accordance with an illustrative embodiment. Operation begins in block 1200, and when receiving an item A, the pedigree system receives a pedigree for item A from an upstream partner (block 1201). The pedigree translator reformats the pedigrees into synthetic events (block 1202). The EPCIS server records the synthetic events (block 1203). The EPCIS capture application generates a native receiving event for item A (block 1204). The pedigree system captures the synthetic and native events and updates the pedigree repository (block 1205).

Then, when shipping item A to a downstream partner, the EPCIS capture application generates a native shipping event (block 1206). The pedigree generator queries the model for relevant pedigree records of item A and generates a shipped pedigree (block 1207). The pedigree system pushes the shipped pedigree of item A to the downstream partner (block 1208). Thereafter, operation ends in block 1209.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for generating an electronic pedigree for a set of items uniquely identified by electronic product codes (EPCs). The mechanisms of the illustrative embodiments exchange track and trace data among supply chain partner systems with the goal to generate an electronic pedigree. A network of independently operated nodes share EPC data using EPCIS events and/or electronic Pedigree documents. Each network node contains an EPCIS event repository and an electronic system which generates pedigrees (the Pedigree engine).

The pedigree system generates electronic pedigrees for items that are received into custody, and for items which are transferred downstream in the supply chain. To generate a pedigree, the pedigree system receives electronic pedigrees and track and trace data from other nodes in the form of PECIS events, queries other nodes for EPCIS events, queries other nodes for electronic pedigrees, converts electronic pedigree data from pedigree documents to EPCIS events, and converts EPCIS events to pedigree documents.

The pedigree system uses a pull data exchange method to query and communicate with other nodes. The pedigree system can also be configured to use a push data exchange method to query and communicate with other nodes. The pedigree system can be configured to use either the pull data exchange method or the push data exchange method based on a set of criteria chosen to maximize throughput and minimize counterfeit risk.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a pedigree data processing system of a supply chain partner, causes the pedigree data processing system to:
generate a receive native event for a first item received from an upstream partner at the supply chain partner, wherein the receive native event contains data that is newly generated by the pedigree data processing system in response to receiving the first item at the supply chain partner;
receive pedigree data for the first item from the upstream partner, wherein the pedigree data comprises at least one record generated upstream from the supply chain partner;
generate at least one synthetic event for the first item based on the pedigree data for the first item, wherein the synthetic event contains data from the upstream partner that is selective to the first item;
store the receive native event and the at least one synthetic event for the first item in a pedigree data repository local to the pedigree data processing system at the supply chain partner;
responsive to determining to send electronic pedigree information for the first item, query the pedigree data repository for events relevant to the first item, receive the receive native event and the at least one synthetic event from the pedigree data repository in response to the query, and dynamically generate an electronic pedigree for the first item based on the receive native event and the at least one synthetic event; and
provide the electronic pedigree to a first downstream partner pedigree system.

2. The computer program product of claim 1, wherein the first item has an associated electronic product code.

3. The computer program product of claim 2, wherein receiving pedigree data for the first item comprises:
receiving a pedigree document from the upstream partner; and
converting the pedigree document electronic product code information system events.

4. The computer program product of claim 3, wherein the receive native event and the at least one synthetic event are electronic product code information system events.

5. The computer program product of claim 4, wherein generating the electronic pedigree for the first item comprises:
converting electronic product code information system events into an pedigree document.

6. The computer program product of claim 1, wherein determining to send electronic pedigree information for the first item comprises:
receiving a request from the first downstream partner pedigree system for art electronic pedigree for the first item using pull data exchange.

7. The computer program product of claim 6, wherein the pedigree data for the first item comprises at least one electronic product code information system event.

8. The computer program product of claim 1, wherein the computer readable program further causes the pedigree data processing system to:
responsive to determining to send electronic pedigree information for a second item to a second downstream partner using push data exchange, query the pedigree data repository for events relevant to the second item, receive at least one native event and at least one synthetic event for the second item from the pedigree data repository in response to the query, and dynamically generate a second electronic pedigree using based on the at least one native event and at least one synthetic event for the second item; and
provide the second electronic pedigree to the second downstream partner responsive to shipping the second item to the second downstream partner.

9. The computer program product of claim 1, wherein the computer readable program is stored in a computer readable storage medium in a data processing system and wherein the computer readable program was downloaded over a network from a remote data processing system.

10. The computer program product of claim 1, wherein the computer readable program is stored in a computer readable storage medium in a server data processing system and wherein the computer readable program is downloaded over a network to a remote data processing system for use in a computer readable storage medium with the remote system.

11. The computer program product of claim 1, wherein receiving the pedigree data for the first item comprises querying one or more upstream partner pedigree systems for pedigree information associated with the first item.

12. The computer program product of claim 1, wherein the computer readable program further causes the pedigree data processing system to store the electronic pedigree for the first item in the pedigree data repository.

13. An apparatus, comprising;
a processor of a pedigree data processing system of a supply chain partner; and
a memory coupled to the processor, wherein the memory comprises instructions which, when executed by the processor, cause the processor to:
generate a receive native event for the first item received from an upstream partner at the supply chain partner, wherein the receive native event contains data that is newly generated by the pedigree data processing system in response to receiving the first item at the supply chain partner;
receive pedigree data for the first item from the upstream partner, wherein the pedigree data comprises at least one record generated upstream from the supply chain partner;
generate at least one synthetic event for the first item based on the pedigree data for the first item, wherein the synthetic event contains data from the upstream partner that is selective to the first item;
store the receive native event and the at least one synthetic event for the first item in a pedigree data repository local to the pedigree data processing system at the supply chain partner;
responsive to determining to send electronic pedigree information for the first item, query the pedigree data repository for events relevant to the first item, receive the receive native event and the at least one synthetic event from the pedigree data repository in response to the query, and dynamically generate an electronic pedigree for the first item based on the receive native event and the at least one synthetic event; and
provide the electronic pedigree to a first downstream partner pedigree system.

14. The apparatus of claim 13, wherein the first item has an associated electronic product code.

15. The apparatus of claim 14, wherein receiving pedigree data for the first item comprises:
   receiving a pedigree document from the upstream partner; and
   converting the pedigree document into electronic product code information system events.

16. The apparatus of claim 15, wherein the received native event and the at least one synthetic event are electronic product code information system events.

17. The apparatus claim 16, wherein generating the electronic pedigree for the first item comprises:
   converting the electronic product code information system events into an electronic pedigree data structure.

18. The apparatus of claim 13, wherein determining to send electronic pedigree information for the first item comprises:
   receiving a request from the first downstream partner pedigree system for an electronic pedigree for the first item using pull data exchange.

19. The apparatus of claim 18, wherein the pedigree data for the first item comprises at least one electronic product code information system event.

20. The apparatus of claim 13, wherein the instructions further cause the processor to:
   responsive to determining to send electronic pedigree information for a second item to a second downstream partner using push data exchange, query the pedigree data repository for events relevant to the second item, receive at least one native event and at least one synthetic event for the second item from the pedigree data repository in response to the query, and dynamically generate a second electronic pedigree based on at least one native event and at least one synthetic event for the second item; and
   provide the second electronic pedigree to the second downstream partner responsive to shipping the second item to the second downstream partner.

\* \* \* \* \*